Nov. 29, 1960 G. E. LOCKETT 2,962,124
LOWERING MECHANISMS
Filed Aug. 8, 1956 2 Sheets-Sheet 1

United States Patent Office 2,962,124
Patented Nov. 29, 1960

2,962,124

LOWERING MECHANISMS

George Edward Lockett, Abingdon, England, assignor to United Kingdom Atomic Energy Authority, London, England Filed Aug. 8, 1956, Ser. No. 602,818

Claims priority, application Great Britain Aug. 12, 1955

7 Claims. (Cl. 185—31)

This invention relates to lowering mechanisms. An object of the invention is to provide a mechanism for rapidly lowering a weight and for smoothly decelerating the weight substantially to rest. Such a mechanism could be used, for example, in the operation of a shut-off element for a nuclear reactor.

According to the invention a weight is lowered at a velocity controlled by a mechanical energy adsorbing device driven by the weight through a motion translating device the drive ratio of which is adapted to increase as the weight falls.

The motion translating device may comprise a crank and connecting rod but preferably comprises two cranks and a connecting link operated over a selected arc of movement of the driving crank.

The energy absorbing device is advantageously a flywheel driven through step-up gearing from the driven crank and through a free wheel device.

The mechanism of the invention is preferably used only to bring the weight nearly to rest, the final energy absorbtion to bring it to rest being performed by other means.

The invention will be more readily understood if reference is made by way of example to the accompanying drawings which illustrate one practical embodiment of a lowering mechanism according to the invention.

Figure 1:
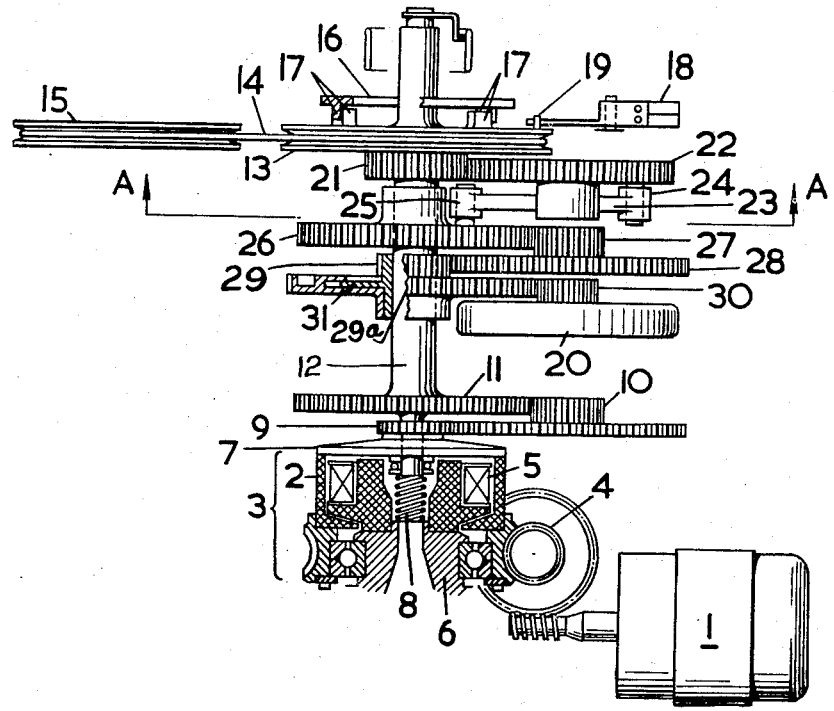
Fig. 1 is a part sectional plan of the mechanism.
Figure 2:
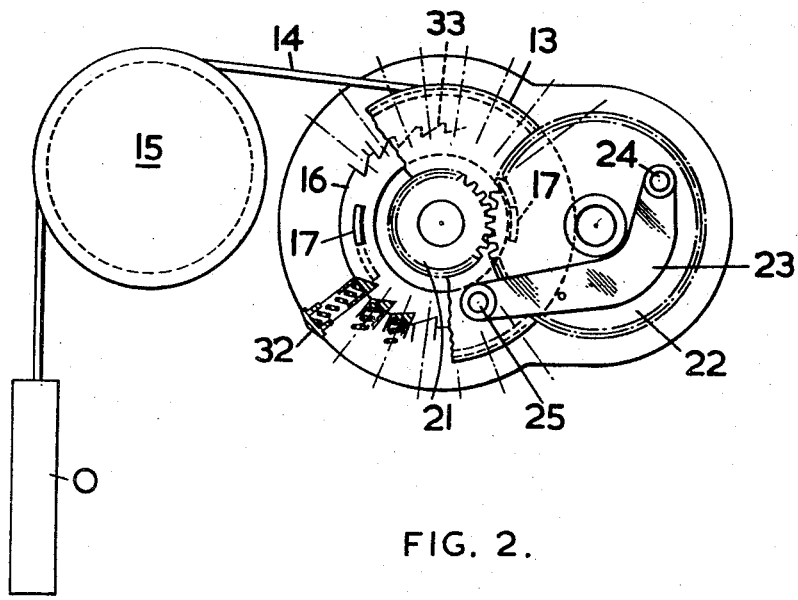
Fig. 2 is a sectional elevation of the mechanism through the line A—A of Fig. 1.

Referring to Figs. 1 and 2. A driving motor 1 rotates the outer driven member 2 of a magnetic clutch 3 through a two stage worm reduction gear 4. When the clutch 3 is energised by passing a current through the energising coil 5 the stationary pole piece 6 and the outer driven member 2 become magentised and the clutch output member 7 is pulled into contact with the outer driven member 2 thereby engaging the clutch 3. The motor drive is then transmitted through spur gears 9, 10 and 11 to the winding pulley shaft 12 and to the winding pulley 13 which lifts a weight O suspended from the winding cable 14, the cable 14 passing over the idler pulley 15. Just under one revolution of the winding pulley 13 is sufficient to move the weight O between its extreme upper and lower positions, rotation of said pulley being limited to less than one revolution by dogs 17 on the pulley and on a torque ring 16 which engage at the limit in both directions of movement of the pulley. Just before the winding pulley 13 has reached the point where the system is in the fully raised position, the upper limit switches 18 are operated by a contact 19 on winding pulley 13 and the motor 1 is switched off. The motor overrun takes the system up to the stop point and any further movement of the motor 1 results in slip of the clutch 3. The system is retained in this position by means of the engaged clutch 3 and the irreversible worm train 4. When the clutch 3 is de-energised the clutch output member 7 is disengaged from the driven member 2 by thrust spring 8 and the suspended weight O begins to fall under gravity and the winding pulley 13 is rotated. The winding pulley 13 is connected to drive a device 20 for absorbing mechanical energy such as a flywheel friction brake or hydraulic brake through spur gears 21 and 22, connecting link 23 between crank pins 24 and 25 on spur gears 22 and 26 respectively, and spur gears 27, 28, 29, 29a and 30. The spur gears 26 and 29 are free to rotate on the shaft 12. The spur gear 29a is mounted to rotate on the hub of gear 29 and to be driven thereby in one direction by a ratchet 31 which drives when the suspended weight is falling and which free wheels when the winding pulley 13 is checked or turned in the opposite direction (i.e. it free wheels when the system is being raised). The connecting link 23 is arranged, as shown more clearly in Fig. 4, such that a drive ratio of zero is produced between winding pulley 13 and device 20 (which it will be assumed is a flywheel) when the system is in the raised position and this drive ratio increases slowly initially and finally more rapidly as the suspended weight O falls.

Figure 4:
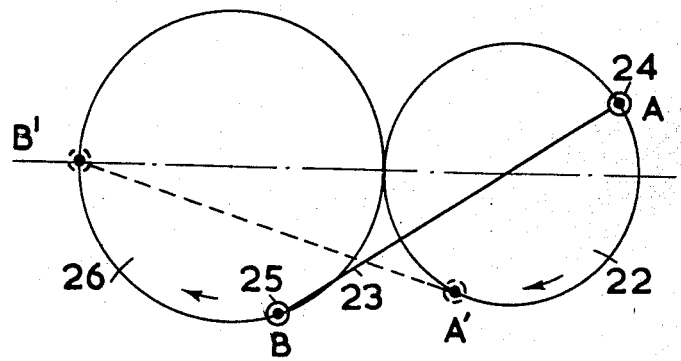
Fig. 3 is a graph showing the variation of the drive ratio (between the winding pulley and the flywheel) with position of the winding pulley and Fig. 4 is a diagram of the connecting link mechanism.
Figure 3:
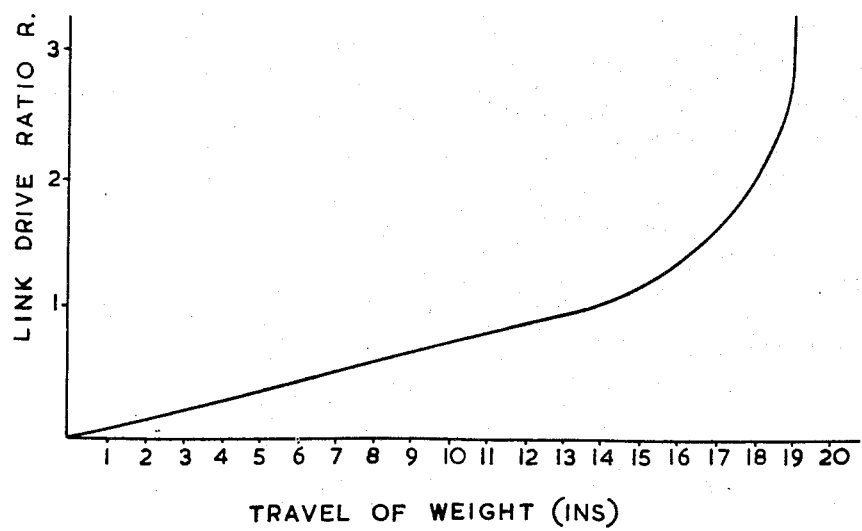

Referring to Figs. 3 and 4. In Fig. 4 the connecting link 23 is shown in two positions i.e. the full line AB shows the link in the position it occupies when the system is fully raised and the dotted line A'B' shown the link in the position it occupies when the system is fully lowered. As can be seen from Fig. 4, when the link 23 moves from the position AB a large rotation of the gear 22 and hence of crank pin 24 produces only a small movement of crank pin 25 and hence a small rotation of gear wheel 26. As the link 23 moves towards the position A'B' the rotation of gear 26 relative to gear 22 and therefore the drive ratio R at any position of the system as given by:

$$R = \frac{\text{Instantaneous angular velocity of gear 26}}{\text{Instantaneous angular velocity of gear 22}}$$

increases as the system moves away from the raised position. The variation of R with amount of drop of a suspended weight is shown in Fig. 3.

Therefore when the clutch 3 is de-energized the suspended weight O will begin to fall and experiences a small initial resistance due to the mechanical inertia of the gears between the clutch 3 and the winding pulley 13. In the present example this mechanical inertia is equivalent to 10% of the weight of the suspended weight O and the suspended weight O therefor falls with an initial acceleration (neglecting friction) of $$\frac{100}{100+10} \cdot g$$

As the suspended weight O falls away from the top position the flywheel drive ratio increases from zero but this increase is small initially and this enables the suspended weight O to fall almost as quickly as a free fall before the flywheel 20 begins to reduce the acceleration. After the weight O has fallen approximately half way between its raised and lowered positions a peak velocity is reached and further travel results in a velocity reduction as the flywheel drive ratio is now increasing rapidly and energy is being transferred to the flywheel 20 at a greater rate than is gained by the suspended weight O in falling. An alternative explanation is that the falling weight O feels a pull due to the inertia drag of the flywheel 20, this inertia increases as the square of the interconnecting drive ratio between the winding pulley 13 and the flywheel 20 and therefore the tension in the cable 14 increases as the weight O falls and the weight O is decelerated, when the drive ratio becomes sufficiently high.

When the suspended weight O has nearly reached its lowered position most of its kinetic energy has been taken up by the rotating flywheel 20. At this point the dogs 17 on the winding pulley 13 and torque ring 16 engage and the torque ring 16 can rotate slightly against the restraint of the spring plungers 32 acting on the serrated edge 33 of the torque ring 16. The spring plungers absorb the remaining kinetic energy of the falling weight O to bring the system to rest. The spring plungers 32 have a high friction factor which ensures a damped check. After the winding pulley 13 has been checked by the torque ring 16 the flywheel 20 experiences no further energy input but it runs on freely due to the ratchet 31 in the variable gear train until friction brings it to rest.

In the present example, the two stage worm reduction train 4 had stages of 43:1 and 58:1 giving an irreversible drive of 2494:1. The clutch train (consisting of gears 9, 10, 11) ratio was 10.144:1. The winding pulley 13 was of such a size that a rotation of 311° moved the suspended weight O a distance of 19″. The variable drive ratio between the winding pulley 13 and the flywheel 20 was zero for the fully raised position of the system and 51:1 when the system was nearly in the lowered position. The moment of inertia of the flywheel which is used is dependent on the weight of the weight O which is being lowered. In modifications hydraulic or friction energy absorbing devices are substituted for the flywheel, or permanent magnet eddy braking may be employed.

I claim:

1. A mechanism for lowering a weight comprising a device for absorbing mechanical energy driven by said weight through a motion translating device having a variable drive ratio, the drive ratio being arranged to increase as the weight falls.

2. A mechanism as claimed in claim 1, wherein the energy absorbing device is a flywheel driven through a free wheel device.

3. A mechanism as claimed in claim 2, wherein the motion translating device comprises a crank and connecting rod.

4. A mechanism as claimed in claim 2, wherein the motion translating device comprises two cranks and a connecting link operated over a selected arc of movement of the driving crank.

5. A mechanism as claimed in claim 4 wherein the energy absorbing device is supplemented by total arresting means to bring the falling weight to rest.

6. A mechanism as claimed in claim 5, wherein the velocity ratio of the motion translating device is zero at the starting position of the mechanism, is small over the first part of the selected arc of movement and increases very rapidly over the final part of said arc.

7. A mechanism as claimed in claim 6, wherein the total arresting means comprise spring plungers engaging a part of the motion translating device towards the end of its travel.

References Cited in the file of this patent

UNITED STATES PATENTS

| | | |
|---|---|---|
| 1,565,705 | Boner | Dec. 15, 1925 |
| 1,815,729 | Armstrong et al. | July 21, 1931 |